US012780119B2

(12) United States Patent
Isobe

(10) Patent No.: US 12,780,119 B2
(45) Date of Patent: Nov. 3, 2026

(54) MOUNTING STRUCTURE OF EXTERIOR MEMBER OF VEHICLE

(71) Applicant: SUBARU CORPORATION, Tokyo (JP)

(72) Inventor: Naohisa Isobe, Tokyo (JP)

(73) Assignee: Subaru Corporation, Tokyo (JP)

( * ) Notice: Subject to any disclaimer, the term of this patent is extended or adjusted under 35 U.S.C. 154(b) by 219 days.

(21) Appl. No.: 18/794,325

(22) Filed: Aug. 5, 2024

(65) Prior Publication Data

US 2025/0083615 A1 Mar. 13, 2025

(30) Foreign Application Priority Data

Sep. 13, 2023 (JP) ................................. 2023-148455

(51) Int. Cl.
*B60J 5/10* (2006.01)
*B60R 13/04* (2006.01)

(52) U.S. Cl.
CPC ............... *B60R 13/04* (2013.01); *B60J 5/107* (2013.01)

(58) Field of Classification Search
CPC .... B60R 13/04; B60J 5/10; B60J 5/101; B60J 5/107; B60J 5/0415
USPC ............... 296/1.07, 1.03, 50, 187.11, 193.08
See application file for complete search history.

(56) References Cited

U.S. PATENT DOCUMENTS 8,419,099 B2 * 4/2013 Inoue ........................ B60J 5/107 52/716.5
9,415,812 B2 * 8/2016 Yoshida ............... B62D 25/105
2009/0243341 A1 * 10/2009 Kimura ................... B60R 13/04 296/191
2011/0179719 A1 * 7/2011 Matsumoto ................ B60J 5/10 49/501
2013/0001982 A1 * 1/2013 Ohba ....................... B60J 5/101 296/187.11
2015/0291016 A1 * 10/2015 Kato ........................ B60J 5/101 49/501
2016/0114663 A1 * 4/2016 Kawashima ............. B60J 5/107 49/501
2023/0339300 A1 * 10/2023 Matsushita .............. B60J 5/107

FOREIGN PATENT DOCUMENTS

JP 2018-122722 A 8/2018
JP 2021-154830 A 10/2021
JP 2021-160562 A 10/2021

* cited by examiner

*Primary Examiner* — Amy R Weisberg
*Assistant Examiner* — Denise L. Esquivel
(74) *Attorney, Agent, or Firm* — McGinn IP Law Group, PLLC

(57) ABSTRACT

Amounting structure of an exterior member of a vehicle includes an outer panel and the exterior member. The outer panel constitutes an outer surface of the vehicle. The exterior member is mounted to an outer surface of the outer panel and supported by the outer panel. The mounting structure includes supports and beads. The supports are formed on the outer panel to mount the exterior member to the outer panel. The beads are formed at an overlap portion of the outer panel that the exterior member mounted to the outer panel overlaps. The beads are interposed between the supports at the overlap portion of the outer panel and are bumps protruding toward an inner side of the vehicle.

16 Claims, 8 Drawing Sheets

MOUNTING STRUCTURE OF EXTERIOR MEMBER OF VEHICLE

CROSS-REFERENCE TO RELATED APPLICATIONS

The present application claims priority from Japanese Patent Application No. 2023-148455 filed on Sep. 13, 2023, the entire contents of which are hereby incorporated by reference.

BACKGROUND

The disclosure relates to a mounting structure of an exterior member of a vehicle.

In a vehicle such as an automobile, an outer panel that constitutes an outer surface of the vehicle is used to define a vehicle cabin of the vehicle, for example, as disclosed in Japanese Unexamined Patent Application Publication (JP-A) No. 2018-122722.

The outer panel disclosed in JP-A No. 2018-122722 is superposed on an inner panel so as to constitute a rear gate of the vehicle that is openable and closable with respect to a rear opening of the vehicle. The rear gate defines a rear portion of a baggage compartment or a vehicle cabin of the vehicle.

In a rear gate of a vehicle disclosed in JP-A No. 2021-154830, a pair of left and right tail lamp members are provided on both left and right sides of an outer panel in parallel with the outer panel. In JP-A No. 2021-154830, the pair of left and right tail lamp members are mounted to an inner panel of the rear gate.

In a rear gate of a vehicle disclosed in JP-A No. 2021-160562, a garnish member is mounted to an upper outer surface of an outer panel.

SUMMARY

An aspect of the disclosure provides a mounting structure of an exterior member of a vehicle. The vehicle includes an outer panel and the exterior member. The outer panel constitutes an outer surface of the vehicle. The exterior member is mounted to an outer surface of the outer panel and supported by the outer panel. The mounting structure includes supports and beads. The supports are formed on the outer panel to mount the exterior member to the outer panel. The beads are formed at an overlap portion of the outer panel that the exterior member mounted to the outer panel overlaps. The beads are interposed between the supports at the overlap portion of the outer panel and are bumps protruding toward an inner side of the vehicle.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

When an exterior member such as a garnish member is mounted to an outer surface of an outer panel as disclosed in JP-A No. 2021-160562, it is possible to provide a design of appearance of a vehicle that is not easily implemented by the outer panel alone. For example, as disclosed in JP-A No. 2021-160562, it is possible to provide a design in which a center portion of the rear gate in an up-down direction protrudes outward. Such a design may be a desirable design that is not provided in the rear gates disclosed in JP-A No. 2018-122722 and JP-A No. 2021-154830.

However, when the exterior member is mounted to the outer surface of the outer panel as in JP-A No. 2021-160562, an abnormal sound such as a so-called muffled sound may be generated due to the mounting. For example, during an idling operation of the vehicle or at the time of opening and closing the rear gate, an abnormal sound such as a so-called muffled sound may be generated. Such an abnormal sound may be heard by an occupant of the vehicle and make the occupant feel uncomfortable.

For example, when the exterior member is mounted to the outer surface of the outer panel as in JP-A No. 2021-160562, the mass of the rear gate may be partially increased at the mounting portion of the exterior member or the exterior member may vibrate on the outer panel. It is predicted that an abnormal sound such as a so-called muffled sound is likely to be generated due to these factors.

As described, in a vehicle, it is desirable to restrict generation of an abnormal sound caused by mounting an exterior member to an outer surface of an outer panel that constitutes an outer surface of the vehicle so that the abnormal sound is less likely to be heard by an occupant of the vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
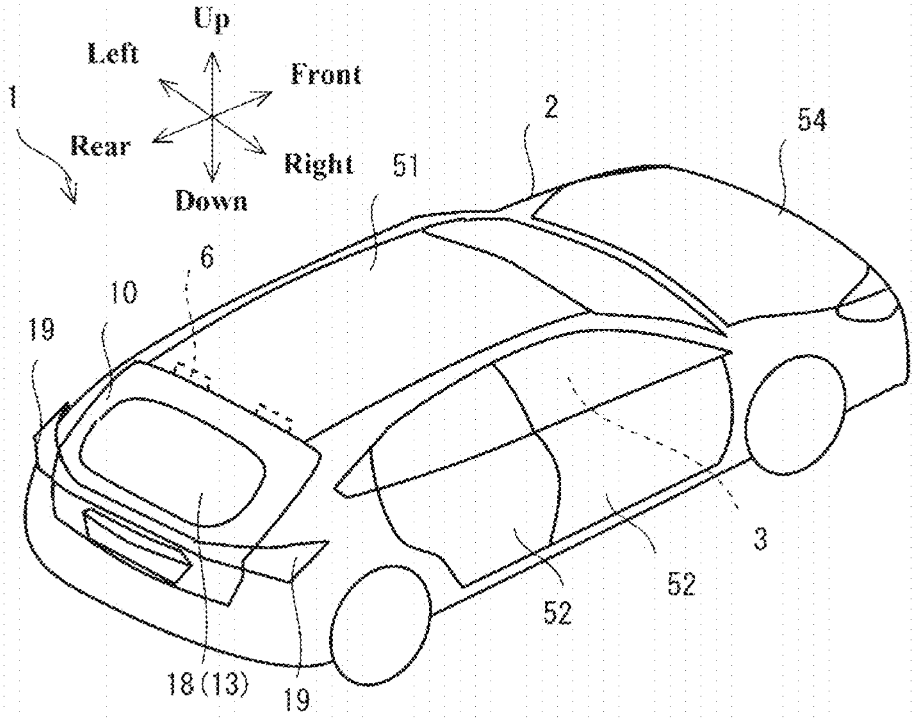
FIG. 1 is a perspective view of an automobile according to an embodiment of the disclosure.

FIG. 1 is a perspective view of an automobile 1 according to the embodiment of the disclosure. In FIG. 1, a rear gate 10 of the automobile 1 is closed.

Figure 2:
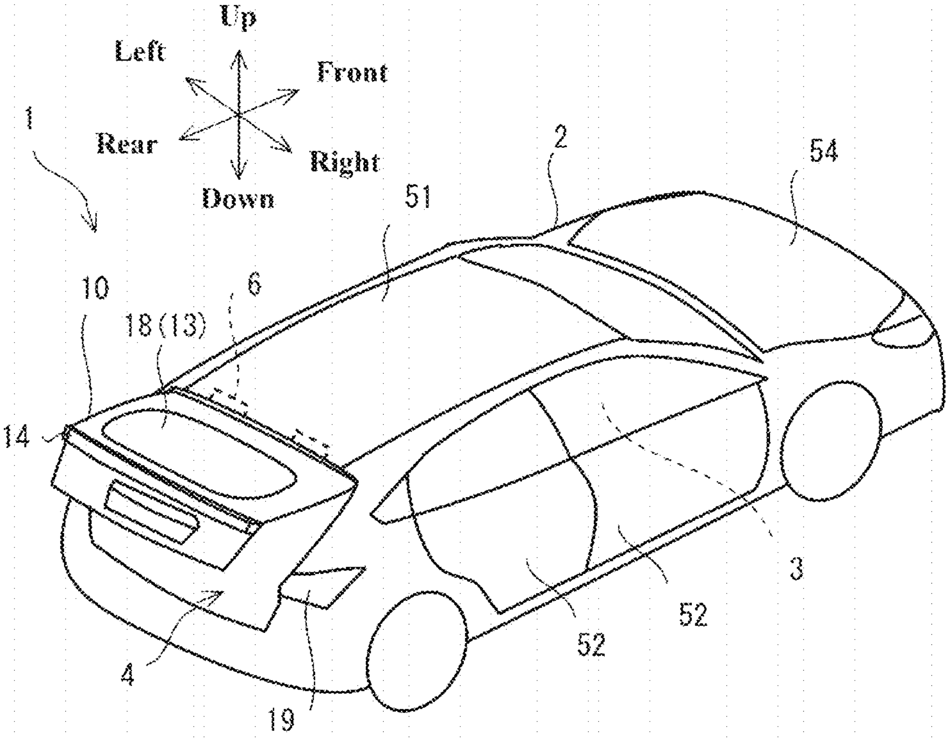
FIG. 2 is a diagram illustrating a state in which a rear gate of the automobile in FIG. 1 is opened.

FIG. 2 is a diagram illustrating a state in which the rear gate 10 of the automobile 1 in FIG. 1 is opened.

In FIG. 1 and subsequent drawings, front-rear, left-right, up-down directions are illustrated with the rear gate 10 in a closed state as illustrated in FIG. 1. A vehicle width direction of the automobile 1 refers to the left-right direction.

The automobile 1 in FIG. 1 is an example of a vehicle. The automobile 1 includes a vehicle body 2 that defines a vehicle cabin 3. The automobile 1 includes doors 52 for an occupant to get into and out of the vehicle cabin 3, and the rear gate 10 for accessing a baggage compartment, which is a rear portion of the vehicle cabin 3. An upper edge of the rear gate 10 is mounted to a roof 51 of the vehicle body 2 by a pair of hinge members 6. As illustrated in FIGS. 1 and 2, the rear gate 10 is openable and closable with respect to a rear opening 4.

As illustrated in FIG. 2, when the rear gate 10 is opened, the rear opening 4 appears in the vehicle body 2 of the automobile 1. The occupant can take baggage in and out the baggage compartment from the rear opening 4. Then, the occupant pulls down the opened rear gate 10. Accordingly, the rear gate 10 closes as illustrated in FIG. 1. The rear opening 4 of the vehicle body 2 of the automobile 1 is closed. The baggage in the baggage compartment does not fall off from the rear opening 4.

Next, regarding a mounting structure of an exterior member of the automobile 1, a case of mounting a transverse garnish member 14 to the rear gate 10 will be described as an example.

An appearance of the automobile 1 illustrated in FIGS. 1 and 2 is a notable design using a wide variety of curved surfaces, including the outer surface of the rear gate 10. The rear gate 10 is in harmony with the other parts of the automobile 1, and the design of the automobile 1 presents overall unity.

Figure 3:
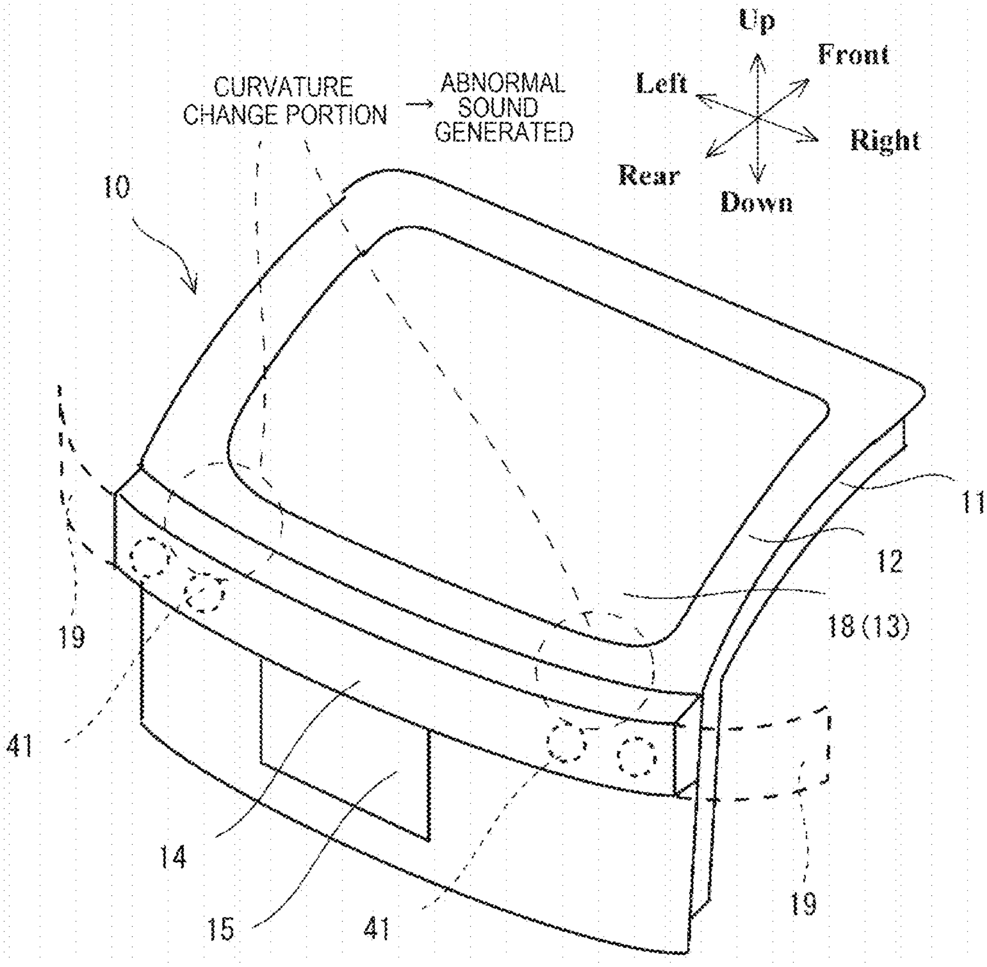
FIG. 3 is a schematic perspective view of the rear gate in FIG. 1.

FIG. 3 is a schematic perspective view of the rear gate 10 in FIG. 1.

As illustrated in FIG. 3, the rear gate 10 includes an outer panel 12 and an inner panel 11. The outer panel 12 constitutes a rear outer surface of the automobile 1. The inner panel 11 is superposed on the outer panel 12 from an inner side. The transverse garnish member 14 is mounted to an outer surface of the outer panel 12.

In order to close the rear opening 4 of the automobile 1, the inner panel 11 and the outer panel 12 are each formed to have an external shape along the rear opening 4 using a steel plate having a substantially quadrangular external shape as illustrated in FIG. 3. For example, the outer panel 12 is exposed on the outer surface of the automobile 1 and constitutes a design of the automobile 1. The inner panel 11 and the outer panel 12 are generally cast into a desired extruded shape by presswork. An outer peripheral edge of the inner panel 11 and an outer peripheral edge of the outer panel 12 may be superposed on each other and attached to each other with an adhesive. The outer peripheral edge of the outer panel 12 may be folded at the outer side of the outer peripheral edge of the inner panel 11 so as to grip the outer peripheral edge of the inner panel 11 with the folded portion. The inner panel 11 and the outer panel 12 superposed with such a structure can obtain basic rigidity necessary for the rear gate 10. Basically, the pair of hinge members 6 may be mounted to an upper edge of the inner panel 11 of the substantially quadrangular steel plate. Accordingly, the pair of hinge members 6 can be covered with the outer panel 12 in the state in which the rear gate 10 is closed, as illustrated in FIG. 1.

An opening 13 is formed in an upper portion of the rear gate 10 by penetrating an upper portion of the inner panel 11 and an upper portion of the outer panel 12, which are formed by casting steel plates having a substantially quadrangular external shape into an extruded shape. A rear glass 18 is fitted into the opening 13 in the upper portion of the rear gate 10, for example, from the outer side of the outer panel 12. The inner panel 11 and the outer panel 12 may be superposed on each other around the opening 13 and attached to each other with an adhesive. An opening edge of the outer panel 12 may be folded at the inner side of an opening edge of the inner panel 11 so as to grip the opening edge of the inner panel 11 with the folded portion. Accordingly, even when the large opening 13 is formed in the upper portions of the inner panel 11 and the outer panel 12, it is possible to obtain the rigidity for maintaining the shape of the upper portions of the inner panel 11 and the outer panel 12.

A plate mount 15 for mounting a plate-like license plate having a substantially quadrangular shape is formed on a lower portion of the outer panel 12 of the rear gate 10. As will be described later, the plate mount 15 may be formed in a planar shape larger than multiple types of license plates so that license plates in multiple countries in which the automobile 1 is registered can be mounted. According to the laws and regulations of each country, the plate mount 15 for mounting the license plate is to be basically flat in order to secure visibility of the license plate, for example. In some countries, a license plate having a light emitting function is allowed by the laws and regulations. In the future, a display member capable of displaying a traveling state such as a self-driving state and a speed in the form of a change in a lighting state may be mounted to the plate mount 15.

The plate mount 15 may be formed on the outer panel 12, for example, by extruding the outer panel 12 by presswork. A frame is formed around the plate mount 15 of the embodiment. The frame is curved by extrusion by presswork. The plate mount 15 is formed in the outer panel 12 in a state of being recessed toward the front direction of the automobile 1 as compared with the remaining portion of the outer panel 12 other than the plate mount 15. Since the curved frame is formed around the plate mount 15, the outer panel 12 can be stiffened. Since the plate mount 15 is formed, it can be expected that the entire outer panel 12 is less likely to vibrate.

The transverse garnish member 14 is provided at a center portion of the outer panel 12 of the rear gate 10 in the up-down direction, which is a portion between the opening 13 for the rear glass 18 and the plate mount 15. The transverse garnish member 14 is provided to be long sideways over the overall width of the outer panel 12 in the vehicle width direction of the automobile 1, at the center portion of the outer panel 12 in the up-down direction. As illustrated in FIG. 1, the transverse garnish member 14 long sideways mounted to the outer surface of the outer panel 12 is provided so as to extend between left and right rear lamp members 19, and constitutes a linear design that presents overall unity with the left and right rear lamp members 19. The transverse garnish member 14 may be provided with a lighting member 41 that can be lit in conjunction with the left and right rear lamp members 19, the lighting member 41 (not illustrated) to illuminate the license plate mounted to the plate mount 15, and the like.

When the transverse garnish member 14 is mounted to the outer surface of the outer panel 12 in this manner, it is possible to provide a design of appearance of the automobile 1 that is not easily implemented by the outer panel 12 alone. In FIG. 3, a design is illustrated in which the transverse garnish member 14 protrudes rearward at the lower portion of the rear gate 10 below the inclined rear glass 18. In such a design, it may be difficult to obtain a favorable shape simply by extruding the outer panel 12 by presswork. Such a design is a notable design for the automobile 1.

However, when an exterior member such as the transverse garnish member 14 is mounted to the outer surface of the outer panel 12, an abnormal sound such as a so-called muffled sound may be generated due to the mounting. For example, during an idling operation of the automobile 1 or at the time of opening and closing the rear gate 10, an abnormal sound such as a so-called muffled sound may be generated. Such an abnormal sound may be heard by an occupant of the automobile 1 and make the occupant feel uncomfortable.

For example, when the transverse garnish member 14 is mounted to the outer surface of the outer panel 12 as illustrated in FIG. 3, the mass of the rear gate 10 may be partially increased at the mounting portion of the transverse garnish member 14, or the transverse garnish member 14 may vibrate on the outer panel 12.

As illustrated in FIG. 3, when a curvature of each of side portions of the outer panel 12 in the left-right direction is larger than a curvature of a center portion of the outer panel 12 in the left-right direction, the transverse garnish member 14 that vibrates on the outer panel 12 easily comes into contact with the outer panel 12 at a portion where the curvature changes.

For these reasons, it is predicted that when an exterior member such as the transverse garnish member 14 is mounted to the outer surface of the outer panel 12, an abnormal sound such as a so-called muffled sound is likely to be generated.

Figure 4:
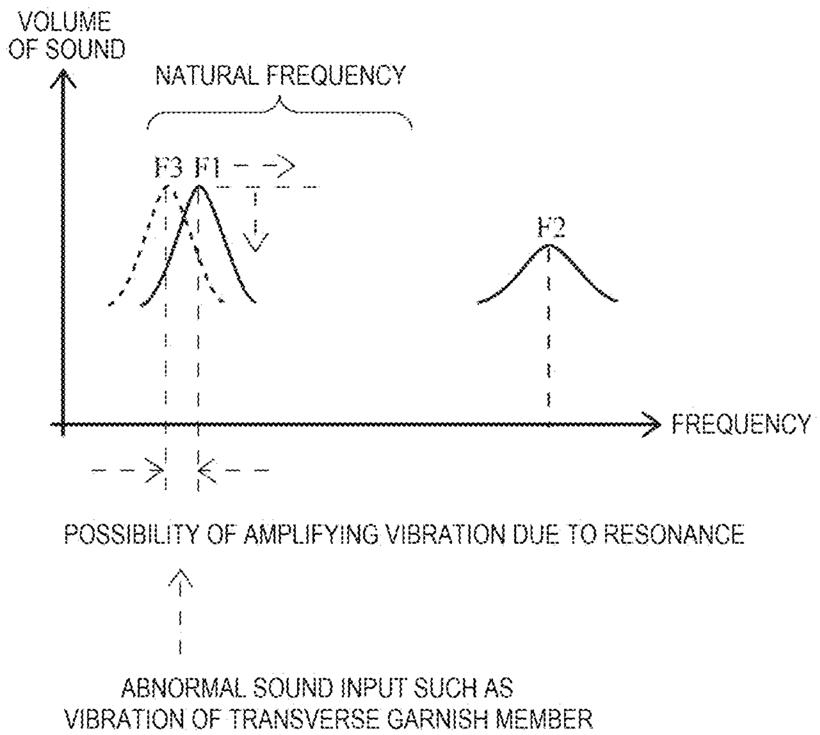
FIG. 4 is a characteristic diagram of frequency illustrating an example of a vibration characteristic of the schematic rear gate in FIG. 3.

FIG. 4 is a characteristic diagram of frequency illustrating an example of a vibration characteristic of the schematic rear gate 10 in FIG. 3.

A horizontal axis in FIG. 4 indicates a frequency. A vertical axis indicates a volume of sound.

As illustrated in FIG. 4, the outer panel 12 has a natural frequency corresponding to an external shape of the outer panel 12, for example. FIG. 4 illustrates a first natural frequency F1 and a second natural frequency F2 as natural frequencies of the outer panel 12.

FIG. 4 illustrates a third natural frequency F3 as a natural frequency of the inner panel 11.

In FIG. 3, the outer panel 12 and the inner panel 11 have substantially the same size in the external shape. In this case, the first natural frequency F1 of the outer panel 12 and the third natural frequency F3 of the inner panel 11 tend to be close to each other, as illustrated in FIG. 4.

When the natural frequency of the outer panel 12 is close to the natural frequency of the inner panel 11 as described, the outer panel 12 and the inner panel 11 tend to resonate.

The transverse garnish member 14 as the exterior member is mounted to the outer surface of such an outer panel 12. When the transverse garnish member 14 vibrates on the outer panel 12 to include a component of a natural frequency causing resonance, an abnormal sound such as a muffled sound caused by the vibration of the transverse garnish member 14 is likely to be amplified or reverberated due to the resonance between the outer panel 12 and the inner panel 11. The amplified abnormal sound or the reverberating abnormal sound is likely to be heard by the occupant of the automobile 1.

The transverse garnish member 14 as an exterior member mounted to the outer surface of the outer panel 12 is likely to vibrate during the idling operation of the automobile 1 or at the time of opening and closing the rear gate 10.

Therefore, in the automobile 1, it is desirable to restrict the generation of an abnormal sound caused by mounting the transverse garnish member 14 serving as the exterior member to the outer surface of the outer panel 12 that constitutes the outer surface of the automobile 1, and make the abnormal sound less likely to be heard by the occupant of the automobile 1.

Figure 5:
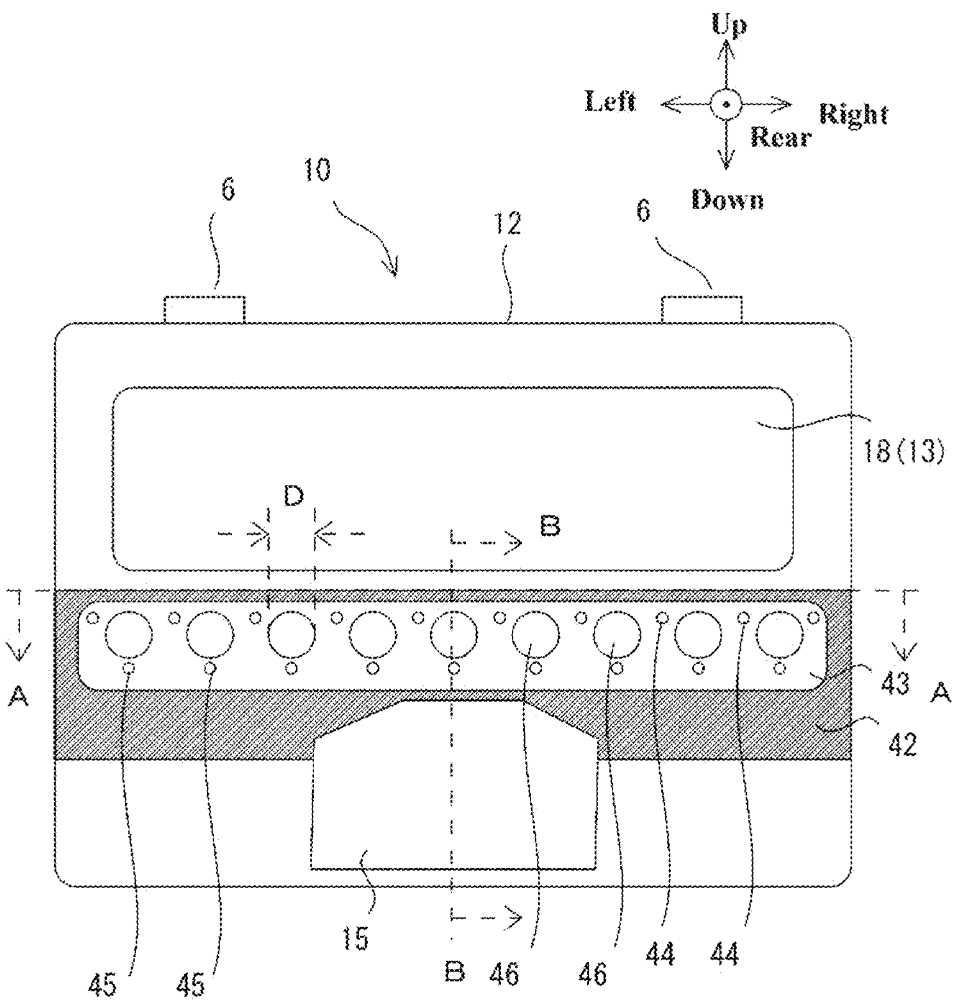
FIG. 5 is an illustrative diagram illustrating a structure of an outer panel of the schematic rear gate in FIG. 3, as viewed from a rear side.

FIG. 5 is an illustrative diagram illustrating a structure of the outer panel 12 of the schematic rear gate 10 in FIG. 3, as viewed from the rear side.

The outer panel 12 can be formed into a shape illustrated in FIG. 5 by extruding a steel plate having a substantially quadrangular external shape by presswork.

Figure 6:
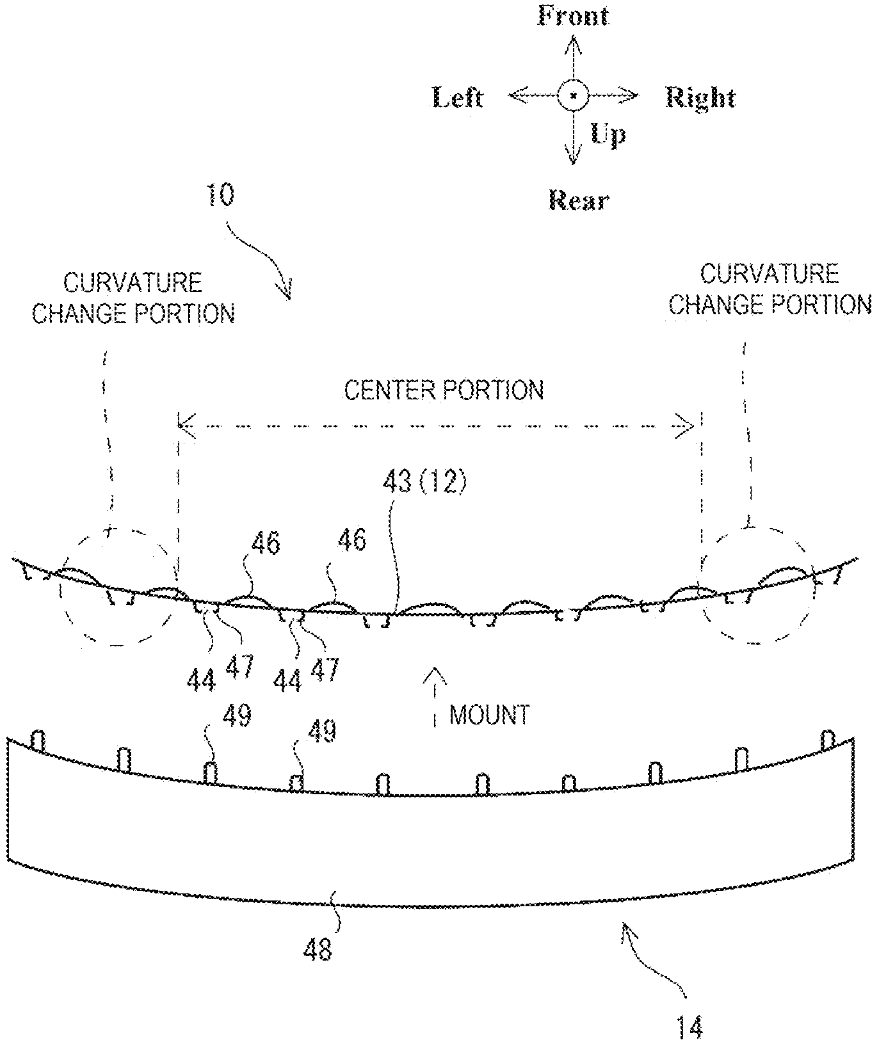
FIG. 6 is a cross-sectional view of the outer panel of the rear gate in FIG. 5, taken along a line A-A.

FIG. 6 is a cross-sectional view of the outer panel 12 of the rear gate 10 in FIG. 5, taken along a line A-A. FIG. 6 illustrates a structure of the transverse garnish member 14 serving as an exterior member mounted to the outer surface of the outer panel 12, and also illustrates a structure of an overlap portion 42 of the outer panel 12.

Figure 7:
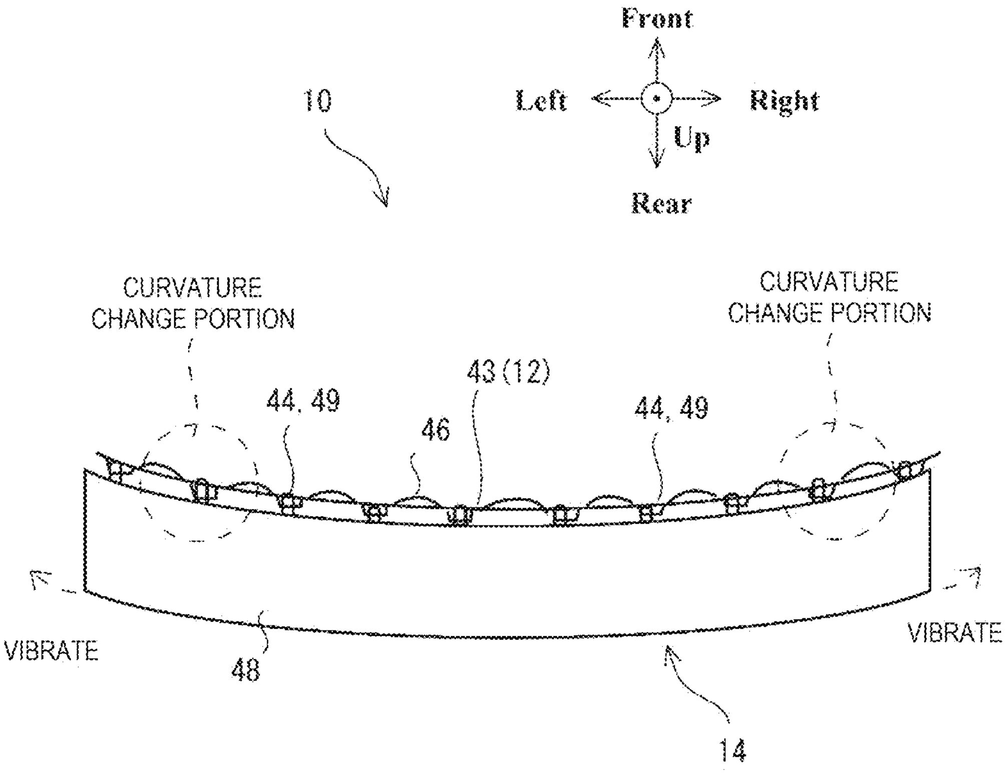
FIG. 7 is an illustrative diagram illustrating a state in which a transverse garnish member in FIG. 6 is mounted to an outer surface of the outer panel.

FIG. 7 is an illustrative diagram illustrating a state in which the transverse garnish member 14 in FIG. 6 is mounted to the outer surface of the outer panel 12.

Figure 8:
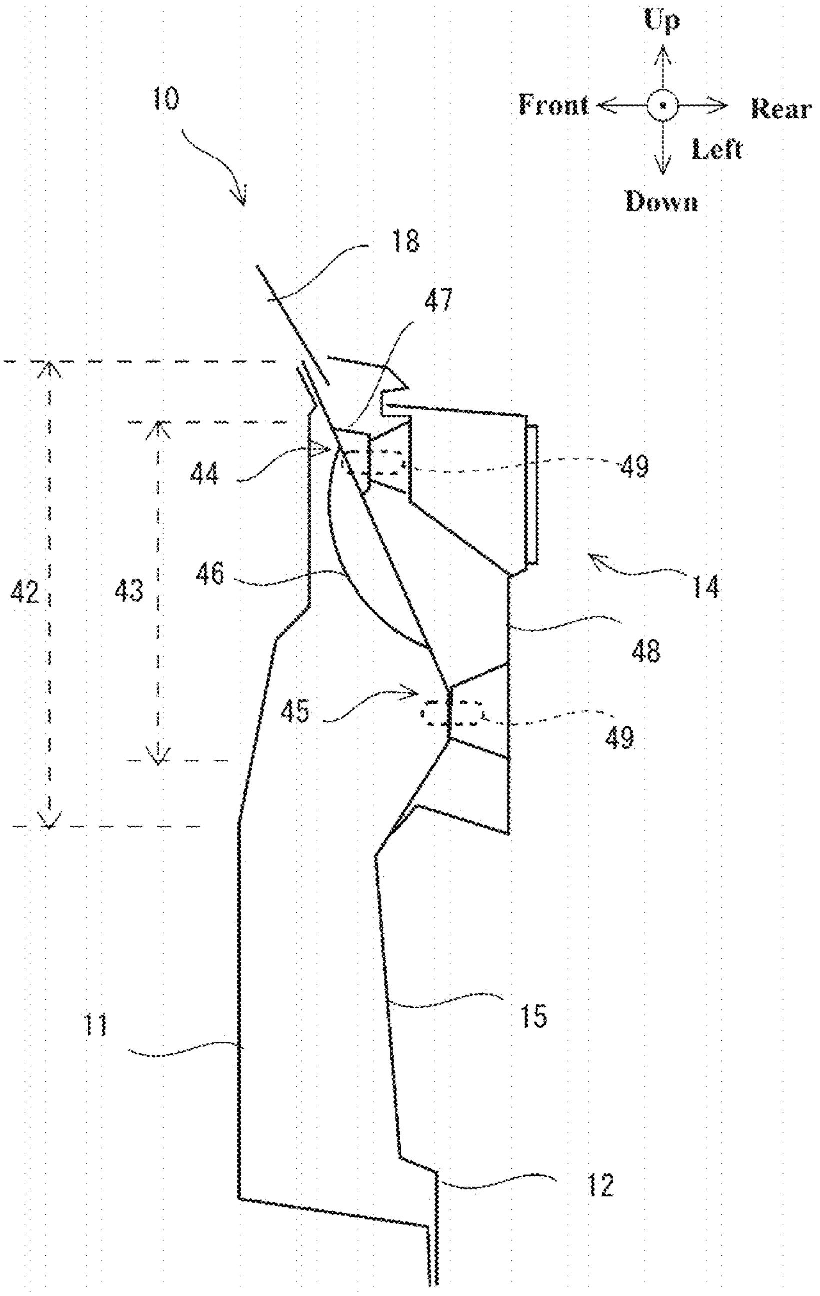
FIG. 8 is a longitudinal cross-sectional view of the outer panel of the rear gate in FIG. 5, taken along a line B-B.

FIG. 8 is a longitudinal cross-sectional view of the outer panel 12 of the rear gate 10 in FIG. 5, taken along a line B-B. FIG. 8 also illustrates the transverse garnish member 14, the rear glass 18, and the like, which are mounted to the outer surface of the outer panel 12.

The opening 13 for fitting the rear glass 18 is formed in the upper portion of the outer panel 12 having a substantially quadrangular external shape.

The plate mount 15 having a planar shape is formed on the center portion in the left-right direction of the lower portion of the outer panel 12 having a substantially quadrangular external shape. A plate-like license plate is mounted to the plate mount 15 having a planar shape.

The center portion in the up-down direction of the outer panel 12 having a substantially quadrangular external shape is provided with the overlap portion 42 that the transverse garnish member 14 mounted to the outer panel 12 overlaps, as indicated by hatching in FIG. 5. The overlap portion 42 is provided, at the center portion of the outer panel 12 in the up-down direction, extending over the overall width of the outer panel 12 in the left-right direction.

An exterior mount 43 for mounting and supporting the transverse garnish member 14 serving as the exterior member to the outer panel 12 is provided at the overlap portion 42 of the outer panel 12. The exterior mount 43 of the outer panel 12 is provided at the center portion of the outer panel 12 in the up-down direction over substantially the overall width of the outer panel 12 in the left-right direction.

Upper support holes 44, lower support holes 45, and beads 46 are formed in the exterior mount 43 that is provided on the inner side of the overlap portion 42 and supports the transverse garnish member 14 on the outer panel 12.

The upper support holes 44 and the lower support holes 45 are support holes for supporting the transverse garnish member 14 on the outer panel 12. As illustrated in FIGS. 6 to 8, the transverse garnish member 14 includes elastic pins 49 insertable into the upper support holes 44 and the lower support holes 45, respectively, on a surface of a garnish body

48 that is mounted to the outer panel 12. As illustrated in FIGS. 7 and 8, the elastic pins 49 are inserted into the upper support holes 44 and the lower support holes 45, so that the transverse garnish member 14 is mounted on the outer surface of the outer panel 12 and supported by the outer panel 12. Accordingly, the upper support holes 44 and the lower support holes 45 serve as supports formed in the outer panel 12 to mount the transverse garnish member 14 to the outer panel 12.

In order to restrict the occurrence of a gap between the outer panel 12 and the transverse garnish member 14 in a state where the transverse garnish member 14 is mounted on the outer surface of the outer panel 12, a mounting surface of the transverse garnish member 14 to the outer panel 12 is in a curved shape conforming to the external shape of the outer panel 12.

As illustrated in FIG. 8, the lower support holes 45 are formed in a portion shaped by causing the overlap portion 42 of the outer panel 12 to project to the rear side in a linear shape long sideways. As illustrated in FIG. 5, the lower support holes 45 are linearly arranged over the overall width of the automobile 1 in the vehicle width direction in the exterior mount 43 on the inner side of the overlap portion 42.

As illustrated in FIG. 8, the upper support holes 44 are formed in tops of respective protrusions 47. The protrusions 47 are linearly arranged over the overall width of the automobile 1 in the vehicle width direction in the exterior mount 43 on the inner side of the overlap portion 42. In this case, the upper support holes 44 are linearly arranged over the overall width of the automobile 1 in the vehicle width direction in the exterior mount 43 on the inner side of the overlap portion 42. The protrusions 47 are formed by deforming the overlap portion 42 of the outer panel 12 into a protruding shape so as to project toward the rear side of the automobile 1. Such protrusions 47 can be shaped into the outer panel 12 by extrusion by presswork.

As illustrated in FIG. 5, at the overlap portion 42 of the outer panel 12, the upper support holes 44 are arranged side by side in the vehicle width direction along an upper edge of the transverse garnish member 14 extending in the vehicle width direction.

Further, at the overlap portion 42 of the outer panel 12, the lower support holes 45 are arranged side by side in the vehicle width direction along a lower edge of the transverse garnish member 14 extending in the vehicle width direction.

The beads 46 are formed side by side in the vehicle width direction at the overlap portion 42 of the outer panel 12.

In FIG. 5, the beads 46 are formed side by side in the vehicle width direction so as to be interposed between, basically, the upper support holes 44 arranged side by side in the vehicle width direction and the lower support holes 45 arranged side by side in the vehicle width direction.

Basically, the beads 46 are alternately arranged with the upper support holes 44 formed in the protrusions 47. Accordingly, the beads 46 are interposed between the upper support holes 44 arranged side by side in the vehicle width direction.

In this case, the upper support holes 44 serve as reference support holes.

The beads 46 may be arranged side by side in the vehicle width direction at the overlap portion 42 of the outer panel 12 in a number different from that in FIG. 5.

By forming the beads 46 at the overlap portion 42 of the outer panel 12, the rigidity and the natural frequency of the outer panel 12 can be changed.

As indicated by horizontal arrows in FIG. 4, the natural frequency of the outer panel 12 can be changed by forming the beads 46 at the overlap portion 42 of the outer panel 12.

As indicated by vertical arrows in FIG. 4, the volume of sound caused by the natural frequency can be changed by forming the beads 46 at the overlap portion 42 of the outer panel 12.

However, it is predicted that a degree of change in the natural frequency differs in accordance with, for example, the number of the beads 46 formed at the overlap portion 42 of the outer panel 12 and an arrangement of the beads 46 at the overlap portion 42.

It is also predicted that the natural frequency of the outer panel 12 itself differs in accordance with, for example, the size and shape of the outer panel 12.

The beads 46 formed at the overlap portion 42 of the outer panel 12 change in a desirable number in accordance with an external shape of a basic design or the like of the automobile 1.

Therefore, the number of the beads 46 to be formed at the overlap portion 42 of the outer panel 12 desirably differs in accordance with basic sizes and shapes of the outer panel 12 and the transverse garnish member 14 of the automobile 1.

For example, depending on the design of the external shape of the automobile 1, it may be desirable to form the beads 46 on alternate lines in FIG. 5, differently from the case in FIG. 5. It may be desirable to form the beads 46 in a concentrated manner at both end portions of the outer panel 12 in the vehicle width direction or to form the beads 46 in a concentrated manner at the center portion of the outer panel 12 in the vehicle width direction.

Alternatively, for example, as illustrated in FIG. 6, it is conceivable to form the beads 46 in a concentrated manner at curvature change portions of the outer panel 12. It is also conceivable to form the beads 46 in a concentrated manner between the right and left curvature change portions of the outer panel 12.

Even when intermittently arranging the beads 46 as described above, it is considered desirable to form the beads 46 based on the arrangement in which the beads 46 are alternately arranged with the upper support holes 44 serving as the reference support holes, as illustrated in FIG. 5.

The reference support holes serving as a reference of the alternate arrangement of the beads 46 may be the lower support holes 45. Differently from the case in FIG. 5, when the upper support holes 44 and the lower support holes 45 are arranged side by side in the up-down direction, the beads 46 may be formed based on the arrangement in which the beads 46 are alternately arranged between the upper and lower support holes 44 and 45 positioned in the up-down direction.

As illustrated in FIG. 8, the bead 46 is a bump protruding toward the inner side of the automobile 1. Herein, since the outer panel 12 of the rear gate 10 is provided on the rear side of the automobile 1, the inner side of the automobile 1 refers to the front side of the automobile 1.

As illustrated in FIG. 5, the bead 46 is formed in a spherical segment shape that is a part of a true spherical shape.

Such a bead 46 can be formed by deforming the overlap portion 42 of the outer panel 12 by extrusion by presswork.

As described, the bead 46 is formed in a spherical segment shape that is a part of a true spherical shape. Accordingly, the bead 46 is less likely to be deformed due to vibration or stress input to the bead 46 regardless of an input direction thereof.

The bead 46 may be formed in a spherical segment shape that is a part of an ellipsoidal spherical shape. Also in this case, the bead 46 is less likely to be deformed due to the vibration or stress input to the bead 46 regardless of the input direction thereof.

On the other hand, if the bead 46 is formed in a polygonal shape such as a quadrangular shape, the bead 46 is likely to be deformed due to the vibration or stress input to the bead 46, depending on the input direction thereof.

In addition, the bead 46 having a spherical segment shape, which is a part of the true spherical shape, may be formed to have a number, size, and depth in accordance with a frequency of the abnormal sound generated from the rear gate 10 including the outer panel 12.

For example, when the first natural frequency F1 of the outer panel 12 in FIG. 3 is to be restricted, the bead 46 having a spherical segment shape may be formed such that a diameter D or a radius D/2 thereof has a length equivalent to, for example, a multiple of the first natural frequency F1 or the inverse of a multiple of the first natural frequency F1. Accordingly, it can be expected that an effect of reducing the volume of sound at the first natural frequency F1 can be obtained. By optimizing the number, size, and depth of the bead 46 to be formed on the outer panel 12, it can be expected to change the natural frequency of the outer panel 12 to reduce the so-called muffled sound that can be heard by the occupant. The number, size, and depth of the bead 46 to be formed on the outer panel 12 can be improved by, for example, forming outer panels 12 that are different from one another in the number, size and depth of the bead 46 and evaluating a generation state of the abnormal sound.

The beads 46 are formed, and each bead 46 can be formed in desired shape and size and is less likely to be affected by a size of the overlap portion 42 of the outer panel 12, for example. For example, each bead 46 can be formed in a shape and a size which enable the restriction on an abnormal sound such as a so-called muffled sound generated in the outer panel 12 to which the transverse garnish member 14 serving as the exterior member is mounted. By forming the beads 46 as described, in the embodiment, it can be expected that at the outer panel 12 to which the transverse garnish member 14 as the exterior member is mounted, for example, an abnormal sound such as a so-called muffled sound that may be generated due to the outer panel 12 vibrating in accordance with the vibration of the exterior member is attenuated.

As illustrated in FIG. 5, an upper end of the bead 46 having a spherical segment shape is partly interposed between a pair among protrusions 47 of a pair of adjacent upper support holes 44.

Accordingly, as illustrated in FIG. 8, the bead 46 having a spherical segment shape extends downward from the same height as the upper support hole 44.

A portion of the exterior mount 43 ranging from the upper support hole 44 to the lower support hole 45 is less likely to bend due to the bead 46 having a spherical segment shape extending downward from the same height as the upper support hole 44.

The exterior mount 43 is less likely to be deformed in such a manner as to be bent within the paper surface in FIG. 8.

As described, the beads 46 can stiffen the exterior mount 43 so that the outer panel 12 is less likely to be deformed in both the vehicle width direction, which is the left-right direction in FIG. 5, and the up-down direction.

As a result, as illustrated in FIG. 7, in a state in which the transverse garnish member 14 serving as the exterior member is mounted on the outer panel 12, even when the transverse garnish member 14 vibrates on the outer surface of the outer panel 12, the beads 46 can restrict the exterior mount 43 from being deformed due to the vibration. The beads 46 can restrict the occurrence that the outer panel 12 vibrates and is deformed together with the exterior mount 43.

For example, as illustrated in FIG. 7, even when the transverse garnish member 14 is about to vibrate on the outer panel 12 having the curvature change portions, since the portion between the support holes 44 and 45 formed at the curvature change portions is stiffened by the beads 46, the deformation of the outer panel 12 at the curvature change portions is less likely to occur. As a result, a support state of the transverse garnish member 14 by the support holes 44 and 45 at the curvature change portions of the outer panel 12 is less likely to change. The transverse garnish member 14 is less likely to vibrate greatly to change a distance from the outer panel 12 at the curvature change portion.

As described above, in the embodiment, the transverse garnish member 14 serving as the exterior member is mounted to the outer panel 12 that constitutes the outer surface of the automobile 1, and the transverse garnish member 14 is supported by the outer panel 12. Therefore, in the embodiment, the support holes 44 and 45 for mounting the transverse garnish member 14 to the outer panel 12 are formed in the outer panel 12. In the embodiment, the beads 46 are further formed at the overlap portion 42 of the outer panel 12 that the transverse garnish member 14 mounted to the outer panel 12 overlaps. The beads 46 are formed so as to be interposed between the support holes 44 and 45 at the overlap portion 42 of the outer panel 12. Accordingly, even when the outer panel 12 constituting the outer surface of the automobile 1 is formed in a shape for the design of the automobile 1, portions between the support holes 44 and 45 formed at the overlap portion 42 of the outer panel 12 can be stiffened by the beads 46.

As a result, in the embodiment, a mutual distance and a relative position of the support holes 44 and 45 formed in the outer panel 12 are less likely to be changed even when the transverse garnish member 14 mounted to the outer panel 12 vibrates on the outer panel 12 or the mass of the rear gate 10 is partly increased due to mounting of the transverse garnish member 14. The outer panel 12 whose basic shape is a shape for the design of the automobile 1 can support the transverse garnish member 14, which is mounted to the outer panel 12 with the support holes 44 and 45 stiffened by the beads 46, such that the transverse garnish member 14 is restricted from vibrating on the outer panel 12.

In the embodiment, beads 46 are formed between the support holes 44 and 45 formed at the overlap portion 42 of the outer panel 12, instead of a single bead 46. The beads 46 are formed, and each bead 46 can be formed in a desired shape and size and is less likely to be affected by the size of the overlap portion 42 of the outer panel 12. For example, each bead 46 can be formed in a shape and a size which enable the restriction on an abnormal sound such as a so-called muffled sound generated in the outer panel 12 to which the transverse garnish member 14 is mounted. For example, each bead 46 is formed in a spherical segment shape that is a part of a true spherical shape or a part of an ellipsoidal spherical shape. By forming the beads 46 each having a spherical segment shape as described, in the embodiment, it can be expected that at the outer panel 12 to which the transverse garnish member 14 is mounted, for example, an abnormal sound such as a so-called muffled sound that may be generated due to the outer panel 12 vibrating in accordance with the vibration of the transverse garnish member 14 is attenuated.

As described, in the embodiment, it can be expected to restrict, on the outer panel 12, the generation of an abnormal sound such as a muffled sound caused by vibration of the transverse garnish member 14 mounted to and supported by the outer panel 12, vibration of the outer panel 12 in reaction to the abnormal sound, resonance of the outer panel 12 and the inner panel 11 with respect to the abnormal sound, and the like. It can be expected that it is less likely for the occupant of the automobile 1 to hear these abnormal sounds generated from the outer panel 12 to which the transverse garnish member 14 is mounted.

In the embodiment, the transverse garnish member 14 serving as the exterior member can be mounted to the outer panel 12 such that an abnormal sound is less likely to be generated. Therefore, in the embodiment, regarding the design of the outer panel 12 and the design of the transverse garnish member 14 serving as the exterior member, there is a low degree of necessity to limit these designs to restrict the generation of the abnormal sound, and it is possible to provide a high degree of freedom for these designs.

In the embodiment, the beads 46 formed at the overlap portion 42 of the outer panel 12 are bumps protruding toward the inner side of the automobile 1. Accordingly, a protrusion that is unnecessarily protruding toward the transverse garnish member 14 mounted to the outer surface of the overlap portion 42 is not formed at the overlap portion 42 of the outer panel 12. The mounting workability of the transverse garnish member 14 to the overlap portion 42 of the outer panel 12 is not hindered by the beads 46.

In the embodiment, the beads 46 are formed by deforming the overlap portion 42 of the outer panel 12 by extrusion by presswork. Accordingly, in the embodiment, it is possible to make an abnormal sound, such as a muffled sound caused by vibration of the outer panel 12 to which the transverse garnish member 14 is mounted, less noticeable by the occupant of the automobile 1, without adding an active damper or the like.

In the embodiment, the outer panel 12 is superposed on the inner panel 11, thereby defining the rear gate 10 of the automobile 1 that is openable and closable with respect to the rear opening 4 of the automobile 1. The transverse garnish member 14 is mounted to the outer surface of the outer panel 12 over the overall width of the outer panel 12 in the vehicle width direction of the automobile 1. In such a mounting structure of the transverse garnish member 14 of the automobile 1, the support holes include the upper support holes 44 and the lower support holes 45. At the overlap portion 42 of the outer panel 12, the upper support holes 44 are arranged side by side in the vehicle width direction along the upper edge of the transverse garnish member 14 extending in the vehicle width direction. At the overlap portion 42 of the outer panel 12, the lower support holes 45 are arranged side by side in the vehicle width direction along the lower edge of the transverse garnish member 14 extending in the vehicle width direction.

In the embodiment, the beads 46 are formed side by side in the vehicle width direction between the upper support holes 44 and the lower support holes 45 at the overlap portion 42 of the outer panel 12.

Accordingly, the beads 46 can restrict, over the overall width of the outer panel 12 in the vehicle width direction of the automobile 1, the deformation of the overlap portion 42 of the outer panel 12 between the upper support hole 44 and the lower support hole 45. Even if the transverse garnish member 14 is mounted over the overall width of the outer panel 12 in the vehicle width direction of the automobile 1, the transverse garnish member 14 can be restricted from vibrating on the outer panel 12 over an overall width of the transverse garnish member 14 in the vehicle width direction.

In the embodiment, since the transverse garnish member 14 can be mounted to the outer panel 12 in a manner of restricting the generation of the abnormal sound, the degree of freedom in designing the appearance of the automobile 1 including the rear gate 10 of the automobile 1 by the combination of the outer panel 12 and the transverse garnish member 14 can be increased. For example, in the embodiment, the outer panel 12 is formed such that the curvature of each side portion of the outer panel 12 in the left-right direction is larger than the curvature of the center portion, and the transverse garnish member 14 is formed accordingly. Even in such a case, in the embodiment, it can be expected to effectively restrict the generation of an abnormal sound at the curvature change portion.

In the embodiment, the beads 46 are formed at the overlap portion 42 of the outer panel 12 such that an arrangement in the vehicle width direction is basically an arrangement in which the beads 46 are alternately arranged with respect to the protrusions 47 with the upper support holes 44.

Moreover, the exterior mount 43 includes the protrusions 47 and the upper support holes 44. The protrusions 47 are formed by deforming, by extrusion by presswork, the overlap portion 42 of the outer panel 12 toward the rear side of the automobile 1 into a protruding shape for each of the upper support holes 44 serving as reference support holes. The upper support holes 44 are formed in the respective tops of the protrusions 47 and the transverse garnish member 14 is mounted via the upper support holes 44.

Accordingly, the protrusions 47 for at least reference support holes and the beads 46 are formed at the overlap portion 42 of the outer panel 12 based on an alternate arrangement. Basically, the protrusions 47 and the beads 46 are alternately arranged at the overlap portion 42 of the outer panel 12 so that a panel structure that is stereoscopic and less likely to be deformed can be formed. The transverse garnish member 14 mounted at the overlap portion 42 of the outer panel 12 is less likely to vibrate on the outer panel 12.

In the embodiment, each of the beads 46 is formed such that a part of the bead 46 is interposed between the pair of protrusions 47 with a pair of upper support holes 44 adjacent to the bead 46. Accordingly, the upper support holes 44 and the beads 46 are arranged in a row in the vehicle width direction of the automobile 1. The overlap portion 42 of the outer panel 12 where the upper support holes 44 are formed is less likely to be deformed due to vibration of the transverse garnish member 14 in the vehicle width direction and in the up-down direction. As a result, the transverse garnish member 14 is less likely to vibrate on the outer panel 12.

In the embodiment, the overlap portion 42 of the outer panel 12 is deformed by extrusion by presswork, and thus various effects described above are obtained. In the embodiment, it is not necessary to add a vibration restriction member such as a dynamic damper to the overlap portion 42 of the outer panel 12 in order to restrict the vibration of the overlap portion 42 of the outer panel 12. In the embodiment, it can be expected that an abnormal sound caused by mounting and supporting an exterior member to the outer panel 12 is restricted while an increase in cost and mass due to the addition of components is restricted.

In the embodiment, the outer panel 12 supports the transverse garnish member 14 serving as the exterior member. Alternatively, for example, the exterior member mounted to the outer surface of the outer panel 12 may be supported by the inner panel 11 or the like that is deformed toward the outer panel 12. However, for example, it may not be easy to greatly curve the external shape of the outer panel 12, and to deform the inner panel 11 up to the inner side of the greatly curved outer panel 12 to support the exterior member. Therefore, in general, a reinforcing member is added between the outer panel 12 and the inner panel 11 instead of deforming the inner panel 11 itself toward the outer panel 12. The addition of the reinforcing member increases the weight of the rear gate 10. In the embodiment, the outer panel 12 can support the exterior member mounted to the outer surface of the outer panel 12, without using such measures. In the embodiment, the shape of the outer panel 12 can have a high degree of freedom so that the outer panel 12 can be greatly curved, for example. In the embodiment, in order to reduce the natural frequency of the outer panel 12, the shape of the outer panel 12 itself is not to be limited.

The above embodiment is a mere example of the disclosure. It is noted that the disclosure is not limited to the above embodiment. Various modifications and changes may be made without departing from the gist of the disclosure.

Figure 9:
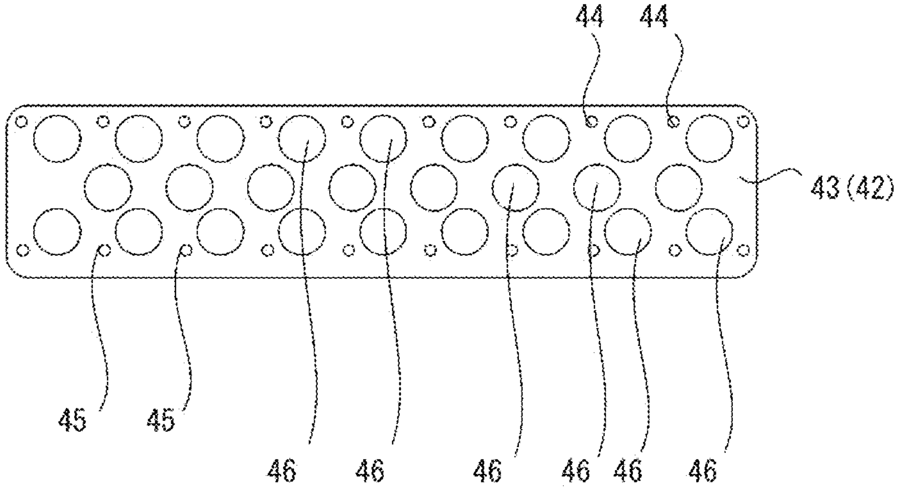
FIG. 9 is a diagram illustrating a modification of an overlap portion of the outer panel that the transverse garnish member mounted to the outer panel overlaps.

FIG. 9 is a diagram illustrating a modification of the overlap portion 42 of the outer panel 12 that the transverse garnish member 14 mounted to the outer panel 12 overlaps.

In the modification in FIG. 9, the upper support holes 44 arranged side by side in the vehicle width direction and the lower support holes 45 arranged side by side in the vehicle width direction are arranged side by side in the up-down direction in the exterior mount 43 that is a part of the overlap portion 42 of the outer panel 12.

The beads 46 are arranged in three rows in the vehicle width direction between the upper support holes 44 arranged side by side in the vehicle width direction and the lower support holes 45 arranged side by side in the vehicle width direction.

An upper portion of each bead 46 having a spherical segment shape in the uppermost row of the three rows in the vehicle width direction are partly interposed between a pair of upper support holes 44 adjacent to the bead 46.

An upper portion of each bead 46 having a spherical segment shape in the lowermost row of the three rows in the vehicle width direction is partly interposed between a pair of lower support holes 45 adjacent to the bead 46.

Even with such a mounting structure of an exterior member according to the modification, it can be expected to obtain various effects similar to those of the above-described embodiment.

The beads 46 may be arranged in two or more rows in the vehicle width direction at the exterior mount 43.

The above-described embodiment is an example of the mounting structure of the exterior member of the automobile 1 in the case of supporting the transverse garnish member 14, which is to be mounted to the outer surface of the outer panel 12 of the rear gate 10, on the outer panel 12.

The outer panel 12 exposed on the outer surface of the automobile 1 in the automobile 1 also includes, for example, the outer panel 12 of the door 52, the outer panel 12 of an engine hood 54, and the outer panel 12 of the roof 51, as illustrated in FIG. 1.

For example, a guard member for preventing a direct collision of the outer panel 12 of the door 52 may be mounted to the outer surface of the outer panel 12 of the door 52 in a manner of extending along the front-rear direction of the automobile 1.

A guard member for providing protection from flying stones may be mounted to the outer panel 12 of the engine hood 54 in a manner of extending along the vehicle width direction of the automobile 1.

A guard member for preventing baggage or the like from directly resting on the outer panel 12 of the roof 51 when placing the baggage or the like on the roof 51 may be mounted to the outer panel 12 of the roof 51 in a manner of extending along the front-rear direction of the automobile 1.

In the automobile 1, it is possible to adopt a mounting structure of an exterior member similar to that of the above-described embodiment to a portion of each of these outer panels 12 that the guard member overlaps.

In the disclosure, the exterior member is mounted to the outer panel that constitutes the outer surface of the vehicle, and the exterior member is supported by the outer panel. Therefore, in the disclosure, the supports for mounting the exterior member to the outer panel are formed on the outer panel. In the disclosure, the beads are formed at the overlap portion of the outer panel that the exterior member mounted to the outer panel overlaps. The beads are formed so as to be interposed between the supports at the overlap portion of the outer panel. Accordingly, even when the outer panel constituting the outer surface of the vehicle is formed in a shape for the design of the vehicle, portions between the supports formed at the overlap portion of the outer panel can be stiffened by the beads.

As a result, in the disclosure, a mutual distance and a relative position of the supports formed on the outer panel are less likely to be changed even when the exterior member mounted to the outer panel vibrates on the outer panel or the mass of the rear gate is partly increased due to mounting of the exterior member. The outer panel whose basic shape is a shape for the design of the vehicle can support the exterior member, which is mounted to the outer panel with the supports stiffened by the beads, such that the exterior member is less likely to vibrate on the outer panel.

In the disclosure, beads are formed between the supports formed at the overlap portion of the outer panel, instead of a single bead. The beads are formed, and each bead can be formed in a desired shape and size and is less likely to be affected by the size of the overlap portion of the outer panel. For example, each bead can be formed in a shape and a size which enable the restriction on an abnormal sound such as a so-called muffled sound generated in the outer panel to which the exterior member is mounted. By forming the beads as described, in the disclosure, it can be expected that at the outer panel to which the exterior member is mounted, for example, an abnormal sound such as a so-called muffled sound that may be generated due to the outer panel vibrating in accordance with the vibration of the exterior member is attenuated.

As described, in the disclosure, it can be expected to restrict, on the outer panel, the generation of an abnormal sound such as a muffled sound caused by the vibration of the exterior member mounted to and supported by the outer panel, vibration of the outer panel in reaction to the abnormal sound, and the like. It can be expected that it is less likely for an occupant of the vehicle to hear these abnormal sounds generated from the outer panel to which the exterior member is mounted.

Moreover, in the disclosure, the exterior member can be mounted to the outer panel such that an abnormal sound is less likely to be generated. Therefore, in the disclosure, regarding the design of the outer panel and the design of the exterior member, there is a low degree of necessity to limit these designs to restrict the generation of the abnormal sound, and it is possible to provide a high degree of freedom for these designs.

Further, in the disclosure, the beads formed at the overlap portion of the outer panel are bumps protruding toward an inner side of the vehicle. Accordingly, a protrusion that is unnecessarily protruding toward the exterior member mounted to an outer surface of the overlap portion is not formed at the overlap portion of the outer panel. The mounting workability of the exterior member to the overlap portion of the outer panel is not hindered by the beads.

The invention claimed is:

1. A mounting structure of an exterior member of a vehicle, the vehicle comprising an outer panel that constitutes an outer surface of the vehicle and the exterior member that is mounted to an outer surface of the outer panel and supported by the outer panel, the mounting structure comprising:

supports formed on the outer panel to mount the exterior member to the outer panel; and beads formed at an overlap portion of the outer panel that the exterior member mounted to the outer panel overlaps, wherein the beads are interposed between the supports at the overlap portion of the outer panel and are bumps protruding toward an inner side of the vehicle such that the exterior member is mountable to the outer surface of the outer panel without the beads protruding toward the exterior member, wherein the beads are formed by deforming the overlap portion of the outer panel by extrusion to project toward the inner side of the vehicle, wherein the vehicle body structure further includes an inner panel, and wherein the beads formed in the outer panel protrude toward the inner panel.

2. The mounting structure of the exterior member of the vehicle according to claim 1, wherein the beads are each formed in a spherical segment shape that is a part of a true spherical shape or a part of an ellipsoidal spherical shape.

3. The mounting structure of the exterior member of the vehicle according to claim 2, wherein the outer panel is superposed on an inner panel, thereby defining a rear gate of the vehicle that is openable and closable with respect to a rear opening of the vehicle, the exterior member is mounted to the outer surface of the outer panel over an overall width of the outer panel in a vehicle width direction of the vehicle, the supports comprise upper supports arranged side by side in the vehicle width direction along an upper edge of the exterior member extending in the vehicle width direction, at the overlap portion of the outer panel, and lower supports arranged, at the overlap portion of the outer panel, side by side in the vehicle width direction along a lower edge of the exterior member extending in the vehicle width direction, and the beads are formed, at the overlap portion of the outer panel, side by side in the vehicle width direction between the upper supports and the lower supports.

4. The mounting structure of the exterior member of the vehicle according to claim 3, wherein reference supports of one or both of the upper supports arranged side by side in the vehicle width direction of the vehicle and the lower supports arranged side by side in the vehicle width direction of the vehicle have protrusions that are formed by deforming the overlap portion of the outer panel into respective protruding shapes for the reference supports, and support holes that are formed in respective tops of the protrusions and via which the exterior member is mounted, and the beads are formed at the overlap portion of the outer panel such that an arrangement in the vehicle width direction is basically an arrangement in which the beads are arranged alternately with respect to the protrusions of the reference supports.

5. The mounting structure of the exterior member of the vehicle according to claim 4, wherein each of the beads is formed such that a part of each of the beads is interposed between a pair among the protrusions of a pair among the reference supports adjacent to the bead.

6. The mounting structure of the exterior member of the vehicle according to claim 2, wherein each of the beads having the spherical segment shape has one of a diameter and a radius having a length equivalent to one of a multiple of a natural frequency of the outer panel and an inverse of the multiple of the natural frequency of the outer panel.

7. The mounting structure of the exterior member of the vehicle according to claim 1, wherein the outer panel is superposed on an inner panel, thereby defining a rear gate of the vehicle that is openable and closable with respect to a rear opening of the vehicle, the exterior member is mounted to the outer surface of the outer panel over an overall width of the outer panel in a vehicle width direction of the vehicle, the supports comprise upper supports arranged side by side in the vehicle width direction along an upper edge of the exterior member extending in the vehicle width direction, at the overlap portion of the outer panel, and lower supports arranged, at the overlap portion of the outer panel, side by side in the vehicle width direction along a lower edge of the exterior member extending in the vehicle width direction, and the beads are formed, at the overlap portion of the outer panel, side by side in the vehicle width direction between the upper supports and the lower supports.

8. The mounting structure of the exterior member of the vehicle according to claim 1, wherein the outer panel is superposed on an inner panel, thereby defining a rear gate of the vehicle that is openable and closable with respect to a rear opening of the vehicle.

9. The mounting structure of the exterior member of the vehicle according to claim 1, wherein the supports comprise support holes formed in the outer panel, and wherein the exterior member comprises elastic pins insertable into the support holes such that the exterior member is supported by the outer panel via insertion of the elastic pins into the support holes.

10. The mounting structure of the exterior member of the vehicle according to claim 1, wherein the outer panel is formed such that a curvature of each of side portions of the outer panel in a vehicle width direction of the vehicle is larger than a curvature of a center portion of the outer panel in the vehicle width direction.

11. The mounting structure of the exterior member of the vehicle according to claim 10, wherein the beads are arranged in a concentrated manner at curvature change portions of the outer panel at which the curvature of the outer panel changes in the vehicle width direction.

12. The mounting structure of the exterior member of the vehicle according to claim 1, wherein the beads are arranged in two or more rows in a vehicle width direction of the vehicle at the overlap portion of the outer panel.

13. The mounting structure of the exterior member of the vehicle according to claim 1, wherein the outer panel is formed of a steel plate, and wherein the beads are integrally formed with the outer panel as part of the steel plate.

14. The mounting structure of the exterior member of the vehicle according to claim 1, wherein the beads each have a cross-sectional profile forming a part of a circle or an ellipse.

15. A mounting structure of an exterior member of a vehicle, the vehicle comprising an outer panel that constitutes an outer surface of the vehicle and the exterior member that is mounted to an outer surface of the outer panel and supported by the outer panel, the mounting structure comprising:

supports formed on the outer panel to mount the exterior member to the outer panel; and beads formed at an overlap portion of the outer panel that the exterior member mounted to the outer panel overlaps, wherein the beads are interposed between the supports at the overlap portion of the outer panel and are bumps protruding toward an inner side of the vehicle, wherein the outer panel is superposed on an inner panel, thereby defining a rear gate of the vehicle that is openable and closable with respect to a rear opening of the vehicle, wherein the exterior member is mounted to the outer surface of the outer panel over an overall width of the outer panel in a vehicle width direction of the vehicle, wherein the supports comprise upper supports arranged side by side in the vehicle width direction along an upper edge of the exterior member extending in the vehicle width direction, at the overlap portion of the outer panel; and lower supports arranged, at the overlap portion of the outer panel, side by side in the vehicle width direction along a lower edge of the exterior member extending in the vehicle width direction, wherein the beads are formed, at the overlap portion of the outer panel, side by side in the vehicle width direction between the upper supports and the lower supports, wherein reference supports of one or both of the upper supports arranged side by side in the vehicle width direction of the vehicle and the lower supports arranged side by side in the vehicle width direction of the vehicle have;

protrusions that are formed by deforming the overlap portion of the outer panel into respective protruding shapes for the reference supports, and support holes that are formed in respective tops of the protrusions and via which the exterior member is mounted, and wherein the beads are formed at the overlap portion of the outer panel such that an arrangement in the vehicle width direction is basically an arrangement in which the beads are arranged alternately with respect to the protrusions of the reference supports.

16. The mounting structure of the exterior member of the vehicle according to claim 15, wherein each of the beads is formed such that a part of each of the beads is interposed between a pair among the protrusions of a pair among the reference supports adjacent to the bead.

* * * * *